Sept. 17, 1929.   J. A. WRIGHT   1,728,847
ELECTRIC MOTOR TRUCK
Filed Dec. 7, 1927   2 Sheets-Sheet 1

Inventor
James A. Wright
By
Attorney.

Sept. 17, 1929.       J. A. WRIGHT       1,728,847
ELECTRIC MOTOR TRUCK
Filed Dec. 7, 1927       2 Sheets-Sheet 2

Inventor
James A. Wright

Patented Sept. 17, 1929

1,728,847

UNITED STATES PATENT OFFICE

JAMES A. WRIGHT, OF MONTREAL, QUEBEC, CANADA

ELECTRIC MOTOR TRUCK

Application filed December 7, 1927. Serial No. 238,399.

This invention relates to electric motor rail trucks and the like, and particularly to improvements in the spring suspension of the same on the wheels.

The object of the invention is to provide a novel spring suspension for such vehicles, in which the solid axles between each pair of wheels is replaced by flexible axles, providing independent wheel action.

A further object is to provide a system of spring suspension in which the motor and driving gear are entirely supported by the springs, and the unsprung weight is reduced to a minimum.

A further object is to provide a four wheel electric motor truck with a system of spring suspension giving greater stability and smoother operation, more flexible and less noisy travel on the rails, increased durability and safety and greater economy in construction and maintenance than has hitherto been obtainable.

Further objects will be referred to hereinafter.

The invention consists briefly of a central stem on which the king pin of the car body is pivoted, having at each end a series of four transverse semielliptic springs, two above and two below, the ends of which are coupled to the wheel carriers on which the wheels are journalled. A central cross member extends from the stem, on the outer ends of which are upper and lower semielliptic springs parallel with the stem, the ends of these springs are coupled to the adjacent wheel carriers.

When a truck of this description is to be motor driven, the motor is bolted on one side of the stem and to a bracket projecting from the cross member. If two motors are employed they are mounted on opposite sides of the stem and cross member to balance the truck.

The driving gear is mounted within the stem and a drive is coupled to the stub axles of the wheels through flexible connections which allow the wheels to have independent action.

The electric motor is controlled in the usual manner by means of controlling a current derived either from a trolley or a generator mounted in the car.

Reference is made to the accompanying drawings in which:—

Figure 1:
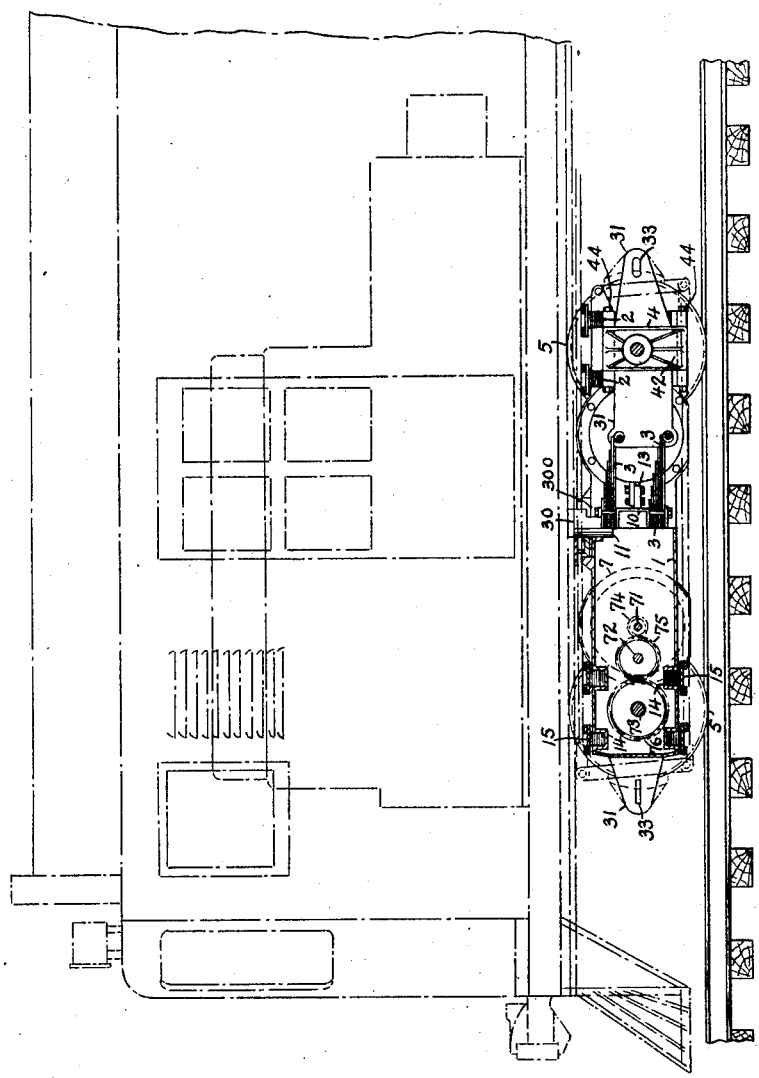
Figure 2:
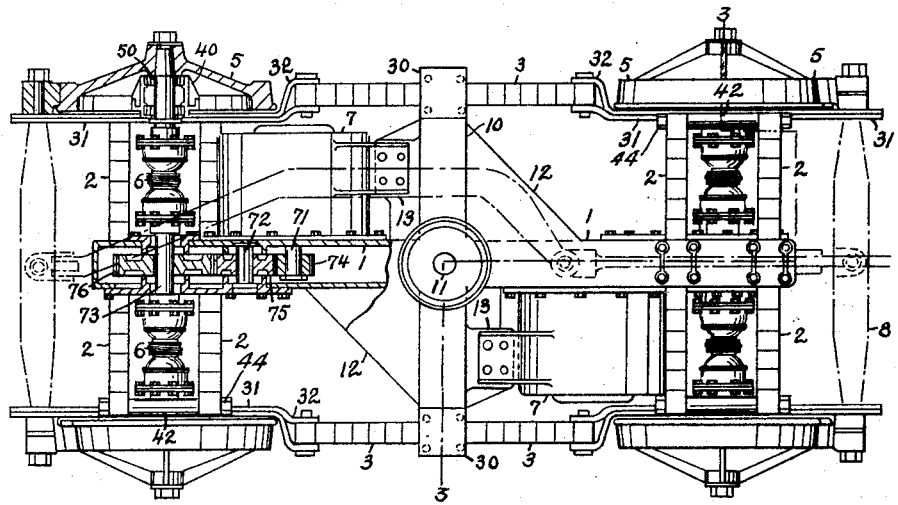
Figure 3:
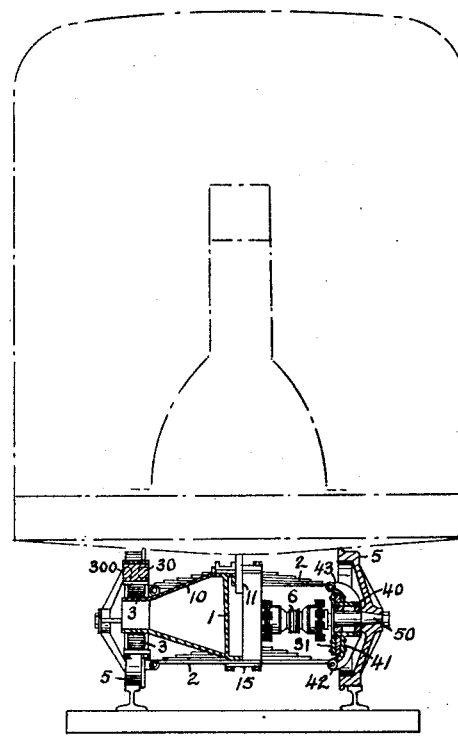

Fig. 1 is a side view partly in section.
Fig. 2 is a plan view partly in section.
Fig. 3 is a vertical cross section on the line 3—3 of Fig. 2.

As shown in Fig. 2 the frame is composed of a boxed girder stem 1, with a central cross member 10, extending on each side of the socket of the king pin 11. Transverse spring seats above and below are cast at each end of the stem in pairs. The angles between the stem 1, and the cross member 10, are preferably filled in by gussets 12, and brackets 13, to which the motors 7, 7, are secured. Semielliptic springs 2, 2, are housed in the seats 14, and are secured by anchor plates 15. The springs 3, 3, of the same type are secured above and below the ends of the cross member 10. The wheel carriers 4, comprise a bearing sleeve 40, a face plate 41, with upper and lower ribs 43, and top and bottom horizontal bored bearings 42, carrying bolts 44.

Riveted to the plate 41, is a wide plate 31, having at one end an offset forked edge 32, in which the ends of the side springs 3, 3, are coupled, and at the other end beyond the wheels horizontal slots 33, in which the brake beams 8, are mounted.

The motors 7, are bolted to the side of the stem 1, and to the brackets 13, on the cross members 10, alternately as shown in Fig. 2. The motor shaft 71, projects into the stem 1, and carries a pinion 74, geared to a pinion 75, on the spindle 72, journalled in the walls of the stem 1. The pinion 75, meshes with the gear wheel 76, keyed to the drive shaft 73.

Flexible connections 6, couple the drive shaft 73, to the stub axles 50, of the wheels 5.

The anchor plates 30, of the upper side springs 3, are blocks with side slots 300, to permit the adjustment of the anchor bolts. These blocks 30, form side supports for the car body.

With a truck designed to run on rails constructed as above set forth, a system of spring suspension is provided which reduces the unsprung weight to a minimum. The wheels, wheel carriers and side plates being the only parts of the assembly that are not supported on the springs.

The rigid stem and cross member form a substantial frame on which the car body is pivotally supported.

The transverse springs securely anchored to this frame, assisted by the longitudinal springs, take up and absorb the road and other shocks which the independent wheels receive.

The driving gear as well as the car body is thus subjected to less vibration resulting in smoother and quieter running and greater durability of the various parts.

This arrangement of the springs maintains each wheel in its proper position parallel to the vertical axis of the frame and car body, while permitting free vertical movement to each wheel independent of that of the other wheels.

When the truck is driven by electric motors, these are suspended on the frame in balanced relationship, and the drive is centralized within the stem. The drive gear is enclosed and protected from injury and dirt.

The brake beams are supported from the wheel carriers whereby the brake shoes are maintained in position relative to the wheels on which they bear.

The electric motors may be operated by current from a trolley or from a generator plant either in the car, or in a car connected thereto.

The whole construction is of a simple and economical design, giving in operation much greater stability and much smoother running than is possible with solid axles.

The independent wheel action also provides great flexibility and ensures greater durability both to the wheels and to the rails, particularly on curves.

What I claim is:—

1. In a rail truck, a stem having a central cross member, spring seats in the stem above and below at each end, transverse springs housed in the seats, wheels having stub axles journalled in independent wheel carriers, the ends of the springs being coupled to the wheel carriers.

2. In a rail truck, a frame comprising a stem and a central cross member, spring seats above and below at each end of the stem, transverse springs housed in the seats, longitudinal springs secured above and below the ends of the cross member, wheels having stub axles journalled on independent wheel carriers, having the ends of the springs coupled to the adjacent wheel carrier.

3. In a rail truck, a stem having a central cross member, spring seats in the stem at each end, above and below, wheels having stub axles journalled in wheel carriers, having the ends of the springs coupled to the wheel carriers, with electric motors mounted on the frame, geared to the stub axles of the wheels.

4. In a rail truck, a frame comprising a stem and a central cross member, spring seats above and below at each end of the stem, transverse springs housed in the seats, longitudinal springs secured above and below the ends of the cross member, wheels having stub axles journalled on wheel carriers, having the ends of the springs coupled to the adjacent wheel carrier, with electric motors mounted on the frame and geared to the stub axles of the wheels.

5. In a rail truck, a frame comprising a stem and a central cross member, transverse springs housed above and below the ends of the stem, wheels journalled on wheel carriers, the ends of the transverse springs coupled to the stub axles of the wheel carriers, longitudinal springs mounted on the ends of the cross member, above and below, brackets extending from the wheel carriers, coupled to the ends of the adjacent springs.

6. In a rail truck, a rectangular spring suspension comprising a frame having a stem and a central cross member, upper and lower series of springs secured to the frame, forming the sides and ends thereof in parallel, wheels journalled on wheel carriers to which the adjacent ends of the springs are coupled.

7. In a rail truck, a frame comprising a stem and a central cross member, wheels having stub axles journalled on independent wheel carriers, springs transversely mounted on the ends of the stem and cross member, having their ends coupled to the adjacent wheel carriers.

8. In a rail truck, a frame comprising a stem and a central cross member, transverse springs housed in the ends of the stem, wheels journalled in wheel carriers, which have face plates and upper and lower bearings, pins mounted in the bearings, coupled to the ends of the transverse springs, bracket plates secured to the face plates having offset brackets, and longitudinal springs mounted on the ends of the cross member having their ends coupled to the adjacent brackets.

9. In an electric motor truck, a frame comprising a stem and a central cross member, springs mounted thereon, wheels having stub axles journalled in wheel carriers in which the ends of the springs are coupled, brackets projecting from the sides of the cross member, electric motors mounted on the brackets and secured to the sides of the stem, and driving gear mounted in the stem, connected by flexible connections to the stub axles of the wheels.

10. In a rail truck, a frame comprising stem and a central cross member, transverse springs housed in the ends of the stem, wheels journalled in wheel carriers, to which the ends of the springs are coupled, plates secured to the wheel carriers extending beyond the wheels with horizontal slots therein, and brake beams slidingly mounted in the slots.

11. In an electric motor truck, a frame suspended on transverse springs, wheels having stub axles journalled in wheel carriers which are coupled to the springs, a motor mounted on the frame, and driving gear mounted on the frame coupled to the stub axles of the wheels by flexible connections.

12. In an electric motor truck, the combination of a frame suspended on transverse springs coupled to wheel carriers in which the wheels having stub axles are journalled, with a motor and driving gear mounted on the frame, and having flexible connections between the driving gear and the stub axles of the wheels.

13. In an electric motor truck, the combination of a frame comprising a stem and a central cross member, wheels having stub axles journalled in wheel carriers coupled to transverse springs supporting the frame, with a motor mounted on the stem, the motor shaft having a pinion within the stem, an idler pinion meshing therewith journalled in the stem walls, a main driving shaft journalled in the walls of the stem, a gear wheel thereon meshing with the idler pinion, and flexible connections between the main shaft and the stub axles of the wheels.

14. In an electric motor truck, a transverse spring supported frame, a motor and driving gear mounted on the frame, wheels mounted on stub axles, and flexible connections between the driving gear and the stub axles of the wheels.

JAMES A. WRIGHT.